(12) United States Patent
Choi et al.

(10) Patent No.: US 11,987,697 B2
(45) Date of Patent: May 21, 2024

(54) THERMOPLASTIC POLYCARBONATE RESIN COMPOSITION AND MOLDED ARTICLE PRODUCED THEREFROM

(71) Applicant: LOTTE CHEMICAL CORPORATION, Seoul (KR)

(72) Inventors: Dong Kil Choi, Uiwang-si (KR); Tae Gon Kang, Uiwang-si (KR); Young Mi Kim, Uiwang-si (KR); Eun Taek Woo, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 269 days.

(21) Appl. No.: 17/510,569

(22) Filed: Oct. 26, 2021

(65) Prior Publication Data
US 2022/0127456 A1 Apr. 28, 2022

(30) Foreign Application Priority Data

Oct. 28, 2020 (KR) .................. 10-2020-0140807

(51) Int. Cl.
| | | |
|---|---|---|
| C08L 69/00 | (2006.01) | |
| C08K 5/42 | (2006.01) | |
| C08K 5/5399 | (2006.01) | |
| C08L 55/02 | (2006.01) | |

(52) U.S. Cl.
CPC .............. C08L 69/00 (2013.01); C08K 5/42 (2013.01); C08K 5/5399 (2013.01); C08L 55/02 (2013.01); C08L 2201/02 (2013.01); C08L 2203/30 (2013.01); C08L 2205/025 (2013.01); C08L 2205/035 (2013.01)

(58) Field of Classification Search
None
See application file for complete search history.

(56) References Cited

U.S. PATENT DOCUMENTS 5,723,526 A * 3/1998 Nagasawa ............... C08L 69/00
524/451
2011/0065848 A1 * 3/2011 Jung ....................... C08L 69/00
524/162

2013/0313493 A1 11/2013 Wen et al.
2013/0317141 A1 11/2013 Cheng et al.
2013/0317143 A1 11/2013 Daga et al.
2013/0317144 A1 11/2013 Wu et al.
2013/0317145 A1 11/2013 An et al.
2013/0317146 A1 11/2013 Li et al.
2013/0317147 A1 11/2013 Li et al.
2013/0317148 A1 11/2013 Zheng et al.
2015/0322261 A1 11/2015 Nakamoto et al.
2016/0185956 A1 * 6/2016 Jung ................... C07F 9/65814
558/80
2019/0203041 A1 7/2019 Park et al.

FOREIGN PATENT DOCUMENTS

| CN | 104955898 A1 | 9/2015 |
|---|---|---|
| CN | 109988405 A1 | 7/2019 |
| EP | 3805315 A1 | 4/2021 |
| KR | 10-2015-0013758 A | 2/2015 |
| WO | 2009/139534 A1 | 11/2009 |
| WO | 2020/096352 A1 | 5/2020 |

OTHER PUBLICATIONS

Ennor; Biochemistry of Phosphagens and Related Guanadines, Physiology vol. 38 (1958) pp. 631-674. (Year: 1958).*

* cited by examiner

*Primary Examiner* — David J Buttner
(74) *Attorney, Agent, or Firm* — Additon, Pendleton & Witherspoon, P.A.

(57) ABSTRACT

A thermoplastic resin composition includes: about 100 parts by weight of a polycarbonate resin; about 0.1 parts by weight to about 1.5 parts by weight of a first rubber-modified vinyl graft copolymer including a diene rubber polymer having an average particle diameter of about 50 nm to about 200 nm; about 0.1 parts by weight to about 1.5 parts by weight of a second rubber-modified vinyl graft copolymer including a diene rubber polymer having an average particle diameter of about 250 nm to about 400 nm; about 0.1 parts by weight to about 1.5 parts by weight of a silicone rubber-modified vinyl graft copolymer; about 3 parts by weight to about 15 parts by weight of a phosphazene compound; and about 0.05 parts by weight to about 0.3 parts by weight of an alkali (earth) metal salt of perfluoroalkylsulfonic acid. The thermoplastic resin composition can exhibit good properties in terms of flame retardancy, chemical resistance (post-plating impact resistance), impact resistance, heat resistance, and balance therebetween.

13 Claims, No Drawings

THERMOPLASTIC POLYCARBONATE RESIN COMPOSITION AND MOLDED ARTICLE PRODUCED THEREFROM

CROSS-REFERENCE TO RELATED APPLICATION

This application claims priority under 35 USC Section 119 to and the benefit of Korean Patent Application No. 10-2020-0140807, filed on Oct. 28, 2020, the entire disclosure of which is incorporated herein by reference.

FIELD

The present invention relates to a thermoplastic resin composition and a molded article produced therefrom.

BACKGROUND

With increasing application of a rapid charging technique to mobile phones, demand for flame retardant polycarbonate resin compositions satisfying IEC 62368 as a safety standard for information and communication technology equipment is increasing. However, a phosphazene compound is almost the only commercially available flame retardant that can satisfy both durability and flame retardancy required for interior/exterior materials for mobile phones that are gradually becoming thinner.

Although the phosphazene compound can function as a high performance flame retardant by realizing relatively excellent flame retardancy even at a low content, as compared to other phosphorus-based flame retardants, a resin composition containing the phosphazene compound inevitably suffers from deterioration in heat resistance, impact resistance, and the like, as the content of the phosphazene compound increases. Thus, it is necessary to develop a more efficient flame retardant system in order to develop interior/exterior materials for mobile phones that are becoming thinner.

For improvement of flame retardancy of the resin composition containing the phosphazene flame retardant, mineral fillers may be added as a flame retardancy enhancer to the resin composition. However, as the content of the mineral fillers increases, the mineral fillers can cause rapid deterioration in impact strength and tensile elongation due to decrease in ductility and can promote decomposition of a polycarbonate resin in various processes, such as extrusion/injection and the like, thereby causing deterioration in mechanical properties and external appearance of the resin composition. In addition, since the mineral fillers rapidly increase the specific gravity of the resin composition, the mineral fillers cannot be a suitable alternative in situations where weight reduction of materials is required. Further, although various phosphoric ester compounds can be used as a flame retardant, a commercially available phosphoric ester flame retardant can cause further deterioration in properties, such as heat resistance, impact resistance, and the like, as compared to the phosphazene flame retardant.

Moreover, when a resin composition is applied to interior/exterior materials for mobile phones, a plating process is required to prevent scratching in daily life and to realize various colors after injection molding for clear coating or securing external appearance. In this case, after dilution of a coating solution or paints with various organic solvents, a resin product is coated or painted with the coating solution or the paints, followed by drying. However, the organic solvents used as diluents in this process intrude into a polycarbonate resin, thereby causing deterioration in transparency and mechanical properties of the resin product.

Therefore, there is a need for development of a thermoplastic resin composition that has good properties in terms of flame retardancy, chemical resistance (post-plating impact resistance), impact resistance, heat resistance, balance therebetween, and the like.

SUMMARY OF THE INVENTION

The present disclosure provides a thermoplastic resin composition that can have good properties in terms of flame retardancy, chemical resistance (post-plating impact resistance), impact resistance, heat resistance, balance therebetween, and the like, and a molded article produced therefrom.

The thermoplastic resin composition includes: about 100 parts by weight of a polycarbonate resin; about 0.1 parts by weight to about 1.5 parts by weight of a first rubber-modified vinyl graft copolymer including a diene rubber polymer having an average particle diameter of about 50 nm to about 200 nm; about 0.1 parts by weight to about 1.5 parts by weight of a second rubber-modified vinyl graft copolymer including a diene rubber polymer having an average particle diameter of about 250 nm to about 400 nm; about 0.1 parts by weight to about 1.5 parts by weight of a silicone rubber-modified vinyl graft copolymer; about 3 parts by weight to about 15 parts by weight of a phosphazene compound; and about 0.05 parts by weight to about 0.3 parts by weight of an alkali (earth) metal salt of perfluoroalkylsulfonic acid.

The first rubber-modified vinyl graft copolymer may be prepared through graft polymerization of a monomer mixture including an aromatic vinyl monomer and a vinyl cyanide monomer to a diene rubber polymer having an average particle diameter of about 50 nm to about 200 nm.

The second rubber-modified vinyl graft copolymer may be prepared through graft polymerization of a monomer mixture including an aromatic vinyl monomer and a vinyl cyanide monomer to a diene rubber polymer having an average particle diameter of about 250 nm to about 400 nm.

The silicone rubber-modified vinyl graft copolymer may be prepared through graft polymerization of an alkyl (meth) acrylate monomer to a silicone rubber polymer.

A weight ratio of the first rubber-modified vinyl graft copolymer to the second rubber-modified vinyl graft copolymer may range from about 1:0.1 to about 1:2.

A weight ratio of the sum of the first rubber-modified vinyl graft copolymer and the second rubber-modified vinyl graft copolymer to the silicone rubber-modified vinyl graft copolymer may range from about 1:0.1 to about 1:1.

A weight ratio of the phosphazene compound to the alkali (earth) metal salt of perfluoroalkylsulfonic acid may range from of about 1:0.006 to about 1:0.05.

The thermoplastic resin composition may have a flame retardancy of V-1 or higher, as measured on a 0.6 mm thick specimen in accordance with the UL-94 vertical test method.

The thermoplastic resin composition may have a fracture height of about 85 cm to about 120 cm, at which a specimen of the thermoplastic resin composition is fractured upon dropping a weight of 500 g on the specimen in accordance with the DuPont drop test method, the specimen being prepared by dipping a 1 mm thick specimen of the thermoplastic resin composition in a thinner solution for 2.5 minutes, drying the specimen at 80° C. for 20 minutes, and leaving the specimen at room temperature for 24 hours.

The thermoplastic resin composition may have a notched Izod impact strength of about 85 kgf·cm/cm to about 110 kgf·cm/cm, as measured on a 3.2 mm thick specimen in accordance with ASTM D256.

The thermoplastic resin composition may have a Vicat softening temperature of about 120° C. to about 135° C., as measured under a load of 5 kg at 50° C./hr in accordance with ISO 306.

The present disclosure also relates to a molded article. The molded article is produced from the thermoplastic resin composition according to any of the embodiments of the present disclosure.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

A thermoplastic resin composition according to the present disclosure includes: (A) a polycarbonate resin; (B) a first rubber-modified vinyl graft copolymer; (C) a second rubber-modified vinyl graft copolymer; (D) a silicone rubber-modified vinyl graft copolymer; (E) a phosphazene compound; and (F) an alkali (earth) metal salt of perfluoroalkylsulfonic acid.

(A) Polycarbonate Resin

The polycarbonate resin according to embodiments of the present disclosure may be selected from among any aromatic polycarbonate resins typically used in thermoplastic resin compositions. For example, the polycarbonate resin may be an aromatic polycarbonate resin prepared by reacting diphenol(s) (aromatic diol compound(s)) with a carbonate precursor, such as phosgene, halogen formate, and/or carbonate diester.

Examples of the diphenol(s) may include 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, and the like, and mixtures and/or combinations thereof, without being limited thereto. For example, the diphenol(s) may include 2,2-bis(4-hydroxyphenyl)propane, 2,2-bis(3,5-dichloro-4-hydroxyphenyl)propane, 2,2-bis(3,5-dimethyl-4-hydroxyphenyl)propane, 2,2-bis(3-methyl-4-hydroxyphenyl)propane, and/or 1,1-bis(4-hydroxyphenyl)cyclohexane, for example 2,2-bis(4-hydroxyphenyl)propane, which is also referred to as bisphenol-A.

In some embodiments, the polycarbonate resin may be a branched polycarbonate resin. For example, the polycarbonate resin may be a polycarbonate resin prepared by adding a tri- or higher polyfunctional compound, for example, a tri- or higher valent phenol group-containing compound, in an amount of about 0.05 parts by mole to about 2 parts by mole relative to about 100 parts by moles of the diphenol(s) used in polymerization.

In some embodiments, the polycarbonate resin may be a homopolycarbonate resin, a copolycarbonate resin, or a blend thereof. In some embodiments, the polycarbonate resin may be partly or completely replaced by an aromatic polyester-carbonate resin obtained by polymerization in the presence of an ester precursor, for example, a bifunctional carboxylic acid.

In some embodiments, the polycarbonate resin may have a weight average molecular weight (Mw) of about 20,000 g/mol to about 400,000 g/mol, for example, about 30,000 g/mol to about 38,000 g/mol, as measured by gel permeation chromatography (GPC). Within this range, the thermoplastic resin composition can have good properties in terms of fluidity (processability), impact resistance, heat resistance, and the like.

(B) First Rubber-Modified Vinyl Graft Copolymer

The first rubber-modified vinyl graft copolymer according to embodiments of the present disclosure can serve to improve flame retardancy, chemical resistance (post-plating impact resistance), impact resistance, heat resistance, and balance therebetween of the thermoplastic resin composition (molded article) together with the polycarbonate resin, the second rubber-modified vinyl graft copolymer, the silicone rubber-modified vinyl graft copolymer, the phosphazene compound, and the alkali (earth) metal salt of perfluoroalkylsulfonic acid.

The first rubber-modified vinyl graft copolymer may be obtained through graft polymerization of a monomer mixture including an aromatic vinyl monomer and a vinyl cyanide monomer to a diene rubber polymer having an average particle diameter of about 50 nm to about 200 nm. In some embodiments, the first rubber-modified vinyl graft copolymer may be obtained through graft polymerization of the monomer mixture including the aromatic vinyl monomer and the vinyl cyanide monomer to the diene rubber polymer, in which the monomer mixture may further include a monomer for imparting processability and heat resistance, as needed. Polymerization may be performed by any suitable polymerization method known in the art, such as emulsion polymerization, suspension polymerization, and the like. In addition, the first rubber-modified vinyl graft copolymer may have a core (diene rubber polymer)-shell (copolymer of the monomer mixture) structure.

Examples of the diene rubber polymer may include without limitation diene rubbers, such as polybutadiene, poly (styrene-butadiene), and/or poly(acrylonitrile-butadiene), saturated rubbers obtained by adding hydrogen to the diene rubbers, and the like. These may be used alone or as a mixture and/or combination thereof. For example, the diene rubber polymer may include polybutadiene rubbers.

The rubber polymer (rubber particle) may have an average particle diameter of about 50 nm to about 200 nm, for example, about 80 nm to about 170 nm. In some embodiments, the rubber polymer (rubber particle) may have an average particle diameter of about 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 nm. Further, according to some embodiments, the rubber polymer (rubber particle) may have an average particle diameter from about any of the foregoing diameters to about any other of the foregoing diameters.

If the average particle diameter of the rubber polymer is less than about 50 nm, the thermoplastic resin composition (molded article) can suffer from deterioration in impact resistance, chemical resistance, and the like. If the average particle diameter of the rubber polymer exceeds about 200 nm, the thermoplastic resin composition (molded article) can suffer from deterioration in flame retardancy, fatigue resistance, and the like.

Here, the average particle diameter refers to the average (Z-average) particle diameter of the rubber polymer and may be measured by a light scattering method in a latex state using techniques and equipment known in the art. For example, a rubber polymer latex can be filtered through a mesh to remove coagulum generated during polymerization of the rubber polymer. Then, a mixed solution of 0.5 g of the latex and 30 ml of distilled water can be placed in a 1,000 ml flask, which in turn can be filled with distilled water to prepare a specimen. Then, 10 ml of the specimen can be transferred to a quartz cell, followed by measurement of the average particle diameter of the rubber polymer using a light scattering particle analyzer (e.g., Malvern Co., Ltd., Nano-zs).

In some embodiments, the first rubber-modified vinyl graft copolymer may include the rubber polymer in an amount of about 35% by weight (wt %) to about 80 wt %, for example, about 40 wt % to about 75 wt %, based on 100 wt % of the first rubber-modified vinyl graft copolymer. In some embodiments, the first rubber-modified vinyl graft copolymer may include the rubber polymer in an amount of about 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79 or 80 wt %, based on 100 wt % of the first rubber-modified vinyl graft copolymer. Further, according to some embodiments, the rubber polymer can be present in an amount of from about any of the foregoing amounts to about any other of the foregoing amounts.

Within this range, the thermoplastic resin composition (molded article) can have good mechanical properties, moldability, and the like.

In some embodiments, the aromatic vinyl monomer may be graft copolymerizable with the rubber polymer. Examples of the aromatic vinyl monomer may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like, and mixtures and/or combinations thereof. For example, the aromatic vinyl monomer may be styrene.

The first rubber-modified vinyl graft copolymer may include the aromatic vinyl monomer in an amount of about 2 wt % to about 40 wt %, for example, about 5 wt % to about 30 wt %, based on 100 wt % of the first rubber-modified vinyl graft copolymer. In some embodiments, the first rubber-modified vinyl graft copolymer may include the aromatic vinyl monomer in an amount of about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %, based on 100 wt % of the first rubber-modified vinyl graft copolymer. Further, according to some embodiments, the aromatic vinyl monomer can be present in an amount of from about any of the foregoing amounts to about any other of the foregoing amounts.

Within this range, the thermoplastic resin composition (molded article) can have good mechanical properties, moldability, and the like.

In some embodiments, the vinyl cyanide monomer is copolymerizable with the aromatic vinyl monomer. Examples of the vinyl cyanide monomer may include without limitation acrylonitrile, methacrylonitrile, ethacrylonitrile, phenyl acrylonitrile, α-chloroacrylonitrile, fumaronitrile, and the like. These may be used alone or as a mixture and/or combination thereof. For example, the vinyl cyanide monomer may include acrylonitrile and/or methacrylonitrile, and the like.

The first rubber-modified vinyl graft copolymer may include the vinyl cyanide monomer in an amount of about 1 wt % to about 25 wt %, for example, about 1 wt % to about 20 wt %, based on 100 wt % of the first rubber-modified vinyl graft copolymer. In some embodiments, the first rubber-modified vinyl graft copolymer may include the vinyl cyanide monomer in an amount of about 1, 2, 3, 4, 5, 6, 7, 8, 9, 10, 11, 12, 13, 14, 15, 16, 17, 18, 19, 20, 21, 22, 23, 24, or 25 wt %, based on 100 wt % of the first rubber-modified vinyl graft copolymer. Further, according to some embodiments, the vinyl cyanide monomer can be present in an amount of from about any of the foregoing amounts to about any other of the foregoing amounts.

Within this range, the thermoplastic resin composition (molded article) can have good mechanical properties, moldability, and the like.

Examples of the monomer for imparting processability and heat resistance may include without limitation maleic anhydride, N-substituted maleimide, and the like, and mixtures and/or combinations thereof.

The first rubber-modified vinyl graft copolymer may include the monomer for imparting processability and heat resistance when present in an amount of about 15 wt % or less, for example, about 0.1 wt % to about 10 wt %, based on 100 wt % of the first rubber-modified vinyl graft copolymer. In some embodiments, the first rubber-modified vinyl graft copolymer may include the monomer for imparting processability and heat resistance in an amount of 0 (the monomer is not present), about 0 (the monomer is present), 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 wt %, based on 100 wt % of the first rubber-modified vinyl graft copolymer. Further, according to some embodiments, the monomer for imparting processability and heat resistance can be present in an amount of from about any of the foregoing amounts to about any other of the foregoing amounts.

Within this range, the monomer for imparting processability and heat resistance can impart processability and heat resistance to the thermoplastic resin composition (molded article) with minimal or no deterioration in other properties.

In some embodiments, the first rubber-modified vinyl graft copolymer may include a g-ABS copolymer obtained by grafting styrene and acrylonitrile to a butadiene rubber polymer having an average particle diameter of about 50 nm to about 200 nm.

In some embodiments, the thermoplastic resin composition (molded article) may include the first rubber-modified vinyl graft copolymer in an amount of about 0.1 parts by weight to about 1.5 parts by weight, for example, about 0.5 parts by weight to about 1.2 parts by weight, relative to about 100 parts by weight of the polycarbonate resin. In some embodiments, the thermoplastic resin composition (molded article) may include the first rubber-modified vinyl graft copolymer in an amount about 0.1, 0.2, 0.3, 0.4, 0.5, 0.6, 0.7, 0.8, 0.9, 1, 1.1, 1.2, 1.3, 1.4, or 1.5 parts by weight, relative to about 100 parts by weight of the polycarbonate resin. Further, according to some embodiments, the first rubber-modified vinyl graft copolymer can be present in an amount of from about any of the foregoing amounts to about any other of the foregoing amounts.

If the amount of the first rubber-modified vinyl graft copolymer is less than about 0.1 parts by weight relative to about 100 parts by weight of the polycarbonate resin, the thermoplastic resin composition (molded article) can suffer from deterioration in impact resistance, chemical resistance, and the like. If the amount of the first rubber-modified vinyl graft copolymer exceeds about 1.5 parts by weight, the thermoplastic resin composition (molded article) can suffer from deterioration in flame retardancy, fatigue resistance, and the like.

(C) Second Rubber-Modified Vinyl Graft Copolymer

The second rubber-modified vinyl graft copolymer according to embodiments of the present disclosure can serve to improve flame retardancy, chemical resistance (post-plating impact resistance), impact resistance, heat resistance, and balance therebetween of the thermoplastic resin composition (molded article) together with the polycarbonate resin, the first rubber-modified vinyl graft copolymer, the silicone rubber-modified vinyl graft copolymer, the phosphazene compound, and the alkali (earth) metal salt of perfluoroalkylsulfonic acid.

The second rubber-modified vinyl graft copolymer may be obtained through graft polymerization of a monomer mixture including an aromatic vinyl monomer and a vinyl cyanide monomer to a diene rubber polymer having an average particle diameter of about 250 nm to about 400 nm. In some embodiments, the second rubber-modified vinyl graft copolymer may be obtained through graft polymerization of a monomer mixture including an aromatic vinyl monomer and a vinyl cyanide monomer to the diene rubber polymer, in which the monomer mixture may further include a monomer for imparting processability and heat resistance, as needed. Polymerization may be performed by any suitable polymerization method known in the art, such as emulsion polymerization, suspension polymerization, and the like. In addition, the second rubber-modified vinyl graft copolymer may have a core (diene rubber polymer)-shell (copolymer of the monomer mixture) structure.

Examples of the diene rubber polymer may include without limitation diene rubbers, such as polybutadiene, poly (styrene-butadiene), and/or poly(acrylonitrile-butadiene), saturated rubbers obtained by adding hydrogen to the diene rubbers, and the like. These may be used alone or as a mixture and/or combination thereof. For example, the diene rubber polymer may include polybutadiene rubbers.

The rubber polymer (rubber particle) may have an average particle diameter of about 250 nm to about 400 nm, for example, about 300 nm to about 350 nm. In some embodiments, the rubber polymer (rubber particle) may have an average particle diameter of about 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, or 400 nm. Further, according to some embodiments, the rubber polymer (rubber particle) may have an average particle diameter from about any of the foregoing diameters to about any other of the foregoing diameters.

If the average particle diameter of the rubber polymer is less than about 250 nm, the thermoplastic resin composition (molded article) can suffer from deterioration in impact resistance, chemical resistance, and the like. If the average particle diameter of the rubber polymer exceeds about 400 nm, the thermoplastic resin composition (molded article) can suffer from deterioration in flame retardancy, external appearance, and the like.

Here, the average particle diameter refers to the average (Z-average) particle diameter of the rubber polymer and may be measured by a light scattering method in a latex state using techniques and equipment known in the art. For example, a rubber polymer latex can be filtered through a mesh to remove coagulum generated during polymerization of the rubber polymer. Then, a mixed solution of 0.5 g of the latex and 30 ml of distilled water can be placed in a 1,000 ml flask, which in turn can be filled with distilled water to prepare a specimen. Then, 10 ml of the specimen can be transferred to a quartz cell, followed by measurement of the average particle diameter of the rubber polymer using a light scattering particle analyzer (Malvern Co., Ltd., Nano-zs).

In some embodiments, the second rubber-modified vinyl graft copolymer may include the rubber polymer in an amount of about 35 wt % to about 75 wt %, for example, about 40 wt % to about 75 wt %, based on 100 wt % of the second rubber-modified vinyl graft copolymer. In some embodiments, the second rubber-modified vinyl graft copolymer may include the rubber polymer in an amount of about 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75 wt %, based on 100 wt % of the second rubber-modified vinyl graft copolymer. Further, according to some embodiments, the rubber polymer can be present in an amount of from about any of the foregoing amounts to about any other of the foregoing amounts.

Within this range, the thermoplastic resin composition (molded article) can have good mechanical properties, moldability, and the like.

In some embodiments, the aromatic vinyl monomer may be graft copolymerizable with the rubber polymer. Examples of the aromatic vinyl monomer may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like, and combinations and/or mixtures thereof. For example, the aromatic vinyl monomer may be styrene.

The second rubber-modified vinyl graft copolymer may include the aromatic vinyl monomer in an amount of about 2 wt % to about 40 wt %, for example, about 5 wt % to about 35 wt %, based on 100 wt % of the second rubber-modified vinyl graft copolymer. In some embodiments, the second rubber-modified vinyl graft copolymer may include the aromatic vinyl monomer in an amount of about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %, based on 100 wt % of the second rubber-modified vinyl graft copolymer. Further, according to some embodiments, the aromatic vinyl monomer can be present in an amount of from about any of the foregoing amounts to about any other of the foregoing amounts.

Within this range, the thermoplastic resin composition (molded article) can have good mechanical properties, moldability, and the like.

In some embodiments, the vinyl cyanide monomer is copolymerizable with the aromatic vinyl monomer. Examples of the vinyl cyanide monomer include without limitation acrylonitrile, methacrylonitrile, ethacrylonitrile, phenyl acrylonitrile, α-chloroacrylonitrile, fumaronitrile, and the like. These may be used alone or as a mixture and/or combination thereof. For example, the vinyl cyanide monomer may include acrylonitrile, methacrylonitrile, and the like.

The second rubber-modified vinyl graft copolymer may include the vinyl cyanide monomer in an amount of about 1 wt % to about 25 wt %, for example, about 1 wt % to about 20 wt %, based on 100 wt % of the second rubber-modified vinyl graft copolymer. In some embodiments, the second rubber-modified vinyl graft copolymer may include the vinyl cyanide monomer in an amount of about 1, 2, 3, 4, 5, 6, 7, 8, 9, 10, 11, 12, 13, 14, 15, 16, 17, 18, 19, 20, 21, 22, 23, 24, or 25 wt %, based on 100 wt % of the second rubber-modified vinyl graft copolymer. Further, according to some embodiments, the vinyl cyanide monomer can be present in an amount of from about any of the foregoing amounts to about any other of the foregoing amounts.

Within this range, the thermoplastic resin composition (molded article) can have good mechanical properties, moldability, and the like.

Examples of the monomer for imparting processability and heat resistance may include without limitation maleic anhydride, N-substituted maleimide, and the like, and the like, and mixtures and/or combinations thereof.

The second rubber-modified vinyl graft copolymer may include the monomer for imparting processability and heat resistance when present in an amount of about 15 wt % or less, for example, about 0.1 wt % to about 10 wt %, based on 100 wt % of the second rubber-modified vinyl graft copolymer. In some embodiments, the second rubber-modified vinyl graft copolymer may include the monomer for imparting processability and heat resistance in an amount of 0 (the monomer is not present), about 0 (the monomer is present), 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 wt %, based on 100 wt % of the second rubber-modified vinyl graft copolymer. Further, according to some embodiments, the monomer for imparting processability and heat resistance can be present in an amount of from about any of the foregoing amounts to about any other of the foregoing amounts.

Within this range, the monomer for imparting processability and heat resistance can impart processability and heat resistance to the thermoplastic resin composition (molded article) with minimal or no deterioration in other properties.

In some embodiments, the second rubber-modified vinyl graft copolymer may include a g-ABS copolymer obtained by grafting styrene and acrylonitrile to a butadiene rubber polymer having an average particle diameter of about 250 nm to about 400 nm.

In some embodiments, the thermoplastic resin composition (molded article) may include the second rubber-modified vinyl graft copolymer present in an amount of about 0.1 parts by weight to about 1.5 parts by weight, for example, about 0.5 parts by weight to about 1.2 parts by weight, relative to about 100 parts by weight of the polycarbonate resin. In some embodiments, the thermoplastic resin composition (molded article) may include the second rubber-modified vinyl graft copolymer in an amount about 0.1, 0.2, 0.3, 0.4, 0.5, 0.6, 0.7, 0.8, 0.9, 1, 1.1, 1.2, 1.3, 1.4, or 1.5 parts by weight, relative to about 100 parts by weight of the polycarbonate resin. Further, according to some embodiments, the second rubber-modified vinyl graft copolymer can be present in an amount of from about any of the foregoing amounts to about any other of the foregoing amounts.

If the amount of the second rubber-modified vinyl graft copolymer is less than about 0.1 parts by weight relative to about 100 parts by weight of the polycarbonate resin, the thermoplastic resin composition (molded article) can suffer from deterioration in impact resistance, chemical resistance, and the like. If the amount of the first rubber-modified vinyl graft copolymer exceeds about 1.5 parts by weight, the thermoplastic resin composition (molded article) can suffer from deterioration in flame retardancy, external appearance, and the like.

In some embodiments, the first rubber-modified vinyl graft copolymer (B) and the second rubber-modified vinyl graft copolymer (C) may be present in a weight ratio (B:C) of about 1:0.1 to about 1:2, for example, about 1:0.5 to about 1:1.5. In some embodiments, the first rubber-modified vinyl graft copolymer (B) and the second rubber-modified vinyl graft copolymer (C) may be present in a weight ratio (B:C) of about 1:0.1, 1:0.2, 1:0.3, 1:0.4, 1:0.5, 1:0.6, 1:0.7, 1:0.8, 1:0.9, 1:1, 1:1.1, 1:1.2, 1:1.3, 1:1.4, 1:1.5, 1:1.6, 1:1.7, 1:1.8, 1:1.9, or 1:2. Further, according to some embodiments, the first rubber-modified vinyl graft copolymer (B) and the second rubber-modified vinyl graft copolymer (C) may be present in a weight ratio (B:C) of from about any of the foregoing weight ratios to about any other of the foregoing weight ratios.

Within this range, the thermoplastic resin composition (molded article) can exhibit good properties in terms of impact resistance, chemical resistance, flame retardancy, and the like.

(D) Silicone Rubber-Modified Vinyl Graft Copolymer

The silicone rubber-modified vinyl graft copolymer according to embodiments of the present disclosure can serve to improve flame retardancy, chemical resistance (post-plating impact resistance), impact resistance, heat resistance, and balance therebetween of the thermoplastic resin composition (molded article) together with the polycarbonate resin, the first rubber-modified vinyl graft copolymer, the second rubber-modified vinyl graft copolymer, the phosphazene compound, and the alkali (earth) metal salt of perfluoroalkylsulfonic acid.

The silicone rubber-modified vinyl graft copolymer may be prepared through graft copolymerization of an alkyl (meth)acrylate monomer as a vinyl-based monomer to a silicone rubber polymer. Polymerization may be performed by any suitable polymerization method known in the art, such as emulsion polymerization, suspension polymerization, and the like. In addition, the silicone rubber-modified vinyl graft copolymer may have a core (silicone rubber polymer)-shell (polymer of the alkyl (meth)acrylate monomer) structure.

In some embodiments, the silicone rubber polymer may be prepared by polymerization of a rubber monomer including a silicone monomer, such as cyclosiloxane and the like. Examples of the cyclosiloxane may include without limitation hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, and the like, and combinations and/or mixtures thereof. Here, a curing agent, such as trimethoxymethylsilane, triethoxyphenylsilane, tetramethoxysilane, tetraethoxysilane, and the like, and combinations and/or mixtures thereof may be used. In some embodiments, the silicone rubber polymer may include silicone-acrylate rubbers, such as polydimethylsiloxane/butyl acrylate rubber (PDMS/BA) and the like.

In some embodiments, the silicone rubber polymer (rubber particles) may have an average particle diameter (D50) of about 0.05 μm to about 6 μm, for example, about 0.15 μm to about 4 μm, and as another example about 0.25 μm to about 3.5 μm, as measured using a particle size analyzer as known in the art. In some embodiments, the silicone rubber polymer (rubber particles) may have an average particle diameter (D50) of about 0.05, 0.06, 0.07, 0.08, 0.09, 0.1, 0.15, 0.20, 0.25, 0.3, 0.35, 0.4, 0.45, 0.5, 0.55, 0.6, 0.65, 0.7, 0.75, 0.8, 0.85, 0.9, 0.95, 1, 1.5, 2, 2.5, 3, 3.5, 4, 4.5, 5, 5.5, or 6 μm. Further, according to some embodiments, the silicone rubber polymer (rubber particles) may have an average particle diameter (D50) from about any of the foregoing diameters to about any other of the foregoing diameters.

Within this range, the thermoplastic resin composition (molded article) can have good properties in terms of the impact resistance, external appearance, and the like. Here, the average particle diameter can be measured by a drying method well-known in the art using a Mastersizer 2000E series analyzer (Malvern).

In some embodiments, the silicone rubber-modified vinyl graft copolymer may include the silicone rubber polymer in an amount of about 20 wt % to about 90 wt %, for example, about 25 wt % to about 85 wt %, based on 100 wt % of the silicone rubber-modified vinyl graft copolymer. In some embodiments, the silicone rubber-modified vinyl graft copolymer may include the silicone rubber polymer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %, based on 100 wt % of the silicone rubber-modified vinyl graft copolymer. Further, according to some embodiments, the silicone rubber polymer can be present in an amount of from about any of the foregoing amounts to about any other of the foregoing amounts.

Within this range, the thermoplastic resin composition (molded article) can have good properties in terms of mechanical properties, flame retardancy, chemical resistance, and the like.

In some embodiments, the alkyl (meth)acrylate monomer is graft copolymerizable to the silicone rubber polymer and may include a $C_1$ to $C_{10}$ alkyl group (meth)acrylate. Examples of the $C_1$ to $C_{10}$ alkyl group (meth)acrylate may include without limitation methyl (meth)acrylate, ethyl (meth)acrylate, propyl (meth)acrylate, butyl (meth)acrylate, and the like, and combinations and/or mixtures thereof. For example, the alkyl (meth)acrylate monomer may be methyl methacrylate, methyl acrylate, or the like.

In some embodiments, the silicone rubber-modified vinyl graft copolymer may include the alkyl (meth)acrylate monomer in an amount of about 10 wt % to about 80 wt %, for example, about 15 wt % to about 75 wt %, based on 100 wt % of the silicone rubber-modified vinyl graft copolymer. In some embodiments, the silicone rubber-modified vinyl graft copolymer may include the alkyl (meth)acrylate monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %, based on 100 wt % of the silicone rubber-modified vinyl graft copolymer. Further, according to some embodiments, the alkyl (meth)acrylate monomer can be present in an amount of from about any of the foregoing amounts to about any other of the foregoing amounts.

Within this range, the thermoplastic resin composition (molded article) can have good properties in terms of mechanical properties, flame retardancy, chemical resistance, and the like.

In some embodiments, the silicone rubber-modified vinyl graft copolymer may be prepared by graft polymerization of the alkyl (meth)acrylate monomer, such as methyl methacrylate and the like, to the silicone rubber polymer, such as polydimethylsiloxane/butyl acrylate (PDMS/BA) rubber.

The thermoplastic resin composition (molded article) may include the silicone rubber-modified vinyl graft copolymer in an amount of about 0.1 parts by weight to about 1.5 parts by weight, for example, about 0.5 parts by weight to about 1.2 parts by weight, relative to about 100 parts by weight of the polycarbonate resin. In some embodiments, the thermoplastic resin composition (molded article) may include the silicone rubber-modified vinyl graft copolymer in an amount about 0.1, 0.2, 0.3, 0.4, 0.5, 0.6, 0.7, 0.8, 0.9, 1, 1.1, 1.2, 1.3, 1.4, or 1.5 parts by weight, relative to about 100 parts by weight of the polycarbonate resin. Further, according to some embodiments, the silicone rubber-modified vinyl graft copolymer can be present in an amount of from about any of the foregoing amounts to about any other of the foregoing amounts.

If the amount of the silicone rubber-modified vinyl graft copolymer is less than about 0.1 parts by weight, the thermoplastic resin composition (molded article) can suffer from deterioration in impact resistance, low temperature impact resistance, and the like. If the amount of the silicone rubber-modified vinyl graft copolymer exceeds about 1.5 parts by weight, the thermoplastic resin composition (molded article) can suffer from deterioration in flame retardancy, external appearance, and the like.

In some embodiments, a weight ratio (B+C:D) of the sum (B+C) of the first rubber-modified vinyl graft copolymer (B) and the second rubber-modified vinyl graft copolymer (C) and the silicone rubber-modified vinyl graft copolymer (D) may be in the range of about 1:0.1 to about 1:1, for example, about 1:0.25 to about 1:0.75. In some embodiments, a weight ratio (B+C:D) of the sum (B+C) of the first rubber-modified vinyl graft copolymer (B) and the second rubber-modified aromatic vinyl graft copolymer (C) and the silicone rubber-modified vinyl graft copolymer (D) may range from about 1:0.1, 1:0.11, 1:0.12, 1:0.13, 1:0.14, 1:0.15, 1:0.16, 1:0.17, 1:0.18, 1:0.19, 1:0.2, 1:0.21, 1:0.22, 1:0.23, 1:0.24, 1:0.25, 1:0.26, 1:0.27, 1:0.28, 1:0.29, 1:0.3, 1:0.31, 1:0.32, 1:0.33, 1:0.34, 1:0.35, 1:0.36, 1:0.37, 1:0.38, 1:0.39, 1:0.4, 1:0.41, 1:0.42, 1:0.43, 1:0.44, 1:0.45, 1:0.46, 1:0.47, 1:0.48, 1:0.49, 1:0.5, 1:0.51, 1:0.52, 1:0.53, 1:0.54, 1:0.55, 1:0.56, 1:0.57, 1:0.58, 1:0.59, 1:0.6, 1:0.61, 1:0.62, 1:0.63, 1:0.64, 1:0.65, 1:0.66, 1:0.67, 1:0.68, 1:0.69, 1:0.7, 1:0.71, 1:0.72, 1:0.73, 1:0.74, 1:0.75, 1:0.76, 1:0.77, 1:0.78, 1:0.79, 1:0.8, 1:0.81, 1:0.82, 1:0.83, 1:0.84, 1:0.85, 1:0.86, 1:0.87, 1:0.88, 1:0.89, 1:0.9, 1:0.91, 1:0.92, 1:0.93, 1:0.94, 1:0.95, 1:0.96, 1:0.97, 1:0.98, 1:0.99, or 1:1. Further, according to some embodiments, the weight ratio (B+C:D) of the sum (B+C) of the first rubber-modified vinyl graft copolymer (B) and the second rubber-modified vinyl graft copolymer (C) and the silicone rubber-modified vinyl graft copolymer (D) may range from about any of the foregoing weight ratios to about any other of the foregoing weight ratios.

Within this range, the thermoplastic resin composition (molded article) can have good properties in terms of impact resistance, chemical resistance, flame retardancy, and the like.

(E) Phosphazene Compound

The phosphazene compound according to embodiments of the present disclosure can serve to improve flame retardancy, chemical resistance (post-plating impact resistance), impact resistance, heat resistance, and balance therebetween of the thermoplastic resin composition (molded article) together with the polycarbonate resin, the first rubber-modified vinyl graft copolymer, the second rubber-modified vinyl graft copolymer, the silicone rubber-modified vinyl graft copolymer, and the alkali (earth) metal salt of perfluoroalkylsulfonic acid, and may be selected from typical phosphazene compounds used in a flame retardant thermoplastic resin composition.

In some embodiments, the phosphazene compound may include a compound represented by Formula 1:

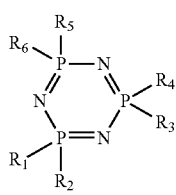

[Formula 1]

wherein $R_1$, $R_2$, $R_3$, $R_4$, $R_5$ and $R_6$ are each independently a hydrogen atom, a halogen atom, a substituted or unsubstituted $C_1$ to $C_{20}$ alkyl group, a substituted or unsubstituted $C_2$ to $C_7$ alkenyl group, a substituted or unsubstituted $C_3$ to $C_{20}$ cycloalkyl group, a substituted or unsubstituted $C_2$ to $C_{20}$ heterocycloalkyl group, a $C_1$ to $C_{20}$ alkoxy group, a $C_6$ to $C_{20}$ aryl group, a $C_6$ to $C_{20}$ aryloxy group, a $C_5$ to $C_{20}$ heteroaryl group, a substituted or unsubstituted $C_3$ to $C_{20}$ alkoxy carbonyl alkyl group, a substituted or unsubstituted $C_2$ to $C_{10}$ carbonyl alkyl group, an amino group, or a hydroxyl group.

Here, "substituted" means that a hydrogen atom is substituted with a substituent, for example, a $C_1$ to $C_{10}$ alkyl group, a halogen atom, a nitro group, a cyano group, a hydroxyl group, an amino group, a $C_6$ to $C_{10}$ aryl group, a $C_3$ to $C_{10}$ cycloalkyl group, a $C_3$ to $C_{10}$ heterocycloalkyl group, a $C_4$ to $C_{10}$ heteroaryl group, and the like, and combinations thereof.

In addition, "alkyl", "alkoxy" and other substituents containing an "alkyl" moiety include linear or branched structures, and "alkenyl" include linear or branched structures having 2 to 8 carbon atoms and containing at least one double bond. In addition, "cycloalkyl" includes saturated monocyclic or saturated bicyclic structures having 3 to 20 carbon atoms. Further, "aryl" is an organic radical derived from an aromatic hydrocarbon through removal of one hydrogen atom therefrom and includes single or fused ring systems containing suitably 4 to 7, preferably 5 or 6 atoms in each ring. For example, "aryl" may include phenyl, naphthyl, biphenyl, tolyl, and the like.

Here, "heterocycloalkyl" means a cycloalkyl group containing 1 to 3 heteroatoms selected from N, O, and/or S as saturated cyclic hydrocarbon backbone atoms, in which the remaining saturated monocyclic or bicyclic ring backbone atoms are carbon atoms. Examples of heterocycloalkyl groups may include without limitation pyrrolidinyl, azetidinyl, pyrazolidinyl, oxazolidinyl, piperidinyl, piperazinyl, morpholinyl, thiomorpholinyl, thiazolidinyl, hydantoinyl, valerolactamyl, oxylanyl, oxetanyl, dioxolanyl, dioxanyl, oxathiolanyl, oxathianyl, dithianyl, dihydrofuranyl, tetrahydrofuranyl, dihydropyranyl, tetrahydropyranyl, tetrahydropyridinyl, tetrahydropyrimidinyl, tetrahydrothiophenyl, tetrahydrothiopyranyl, diazepanyl, azepanyl, and the like.

In addition, "heteroaryl" means an aryl group containing 1 to 3 heteroatoms selected from N, O, and/or S as aromatic ring backbone atoms, in which the remaining ring backbone atoms are carbon atoms. The heteroaryl group may include a divalent aryl group in which a heteroatom in the ring is oxidized or quaternized to form, for example, an N-oxide or a quaternary salt. Examples of heteroaryl groups may include without limitation furyl, thiophenyl, pyrrolyl, pyranyl, imidazolyl, pyrazolyl, thiazolyl, thiadiazolyl, isothiazolyl, isoxazolyl, oxazolyl, oxadiazolyl, triazinyl, tetrazinyl, triazolyl, tetrazolyl, furazanyl, pyridyl, pyrazinyl, pyrimidinyl, pyridazinyl, and the like.

The thermoplastic resin composition (molded article) may include the phosphazene compound in an amount of about 3 parts by weight to about 15 parts by weight, for example, about 5 parts by weight to about 12 parts by weight, relative to about 100 parts by weight of the polycarbonate resin. In some embodiments, the thermoplastic resin composition (molded article) may include the phosphazene compound in an amount about 3, 4, 5, 6, 7, 8, 9, 10, 11, 12, 13, 14, or 15 parts by weight, relative to about 100 parts by weight of the polycarbonate resin. Further, according to some embodiments, the phosphazene compound can be present in an amount of from about any of the foregoing amounts to about any other of the foregoing amounts.

If the amount of the phosphazene compound is less than about 3 parts by weight relative to about 100 parts by weight of the polycarbonate resin (molded article), the thermoplastic resin composition (molded article) can suffer from deterioration in flame retardancy, fluidity, and the like. If the amount of the phosphazene compound exceeds about 15 parts by weight, the thermoplastic resin composition (molded article) can suffer from deterioration in impact resistance, chemical resistance, heat resistance, and the like.

(F) Alkali (Earth) Metal Salt of Perfluoroalkylsulfonic Acid

The alkali (earth) metal salt of perfluoroalkylsulfonic acid according to embodiments of the present disclosure can serve to improve flame retardancy, chemical resistance (post-plating impact resistance), impact resistance, heat resistance, and balance therebetween of the thermoplastic resin composition (molded article) together with the polycarbonate resin, the first rubber-modified vinyl graft copolymer, the second rubber-modified vinyl graft copolymer, the silicone rubber-modified vinyl graft copolymer, and the phosphazene compound. As used herein, the term "alkali (earth) metal" refers to an alkali metal and/or an alkaline earth metal.

In some embodiments, the alkali (earth) metal salt of perfluoroalkylsulfonic acid may include a compound represented by Formula 2:

$$(C_nF_{2n+1}SO_3)_aM \qquad \text{[Formula 2]}$$

where M denotes an alkali metal, such as lithium, sodium, potassium, and/or cesium, and/or an alkaline-earth metal, such as magnesium, calcium, strontium, and/or barium; a is the valence of M; and n is an integer of 1 to 10.

Examples of the perfluoroalkylsulfonic acid may include without limitation perfluoromethanesulfonic acid, perfluoroethanesulfonic acid, perfluoropropanesulfonic acid, perfluorobutanesulfonic acid, perfluoromethylbutanesulfonic acid, perfluorohexanesulfonic acid, perfluoroheptanesulfonic acid, perfluorooctanesulfonic acid, and the like, and combinations and/or mixtures thereof.

In some embodiments, the alkali (earth) metal salt of the perfluoroalkylsulfonic acid may include a potassium salt of the perfluoroalkylsulfonic acid.

In some embodiments, the thermoplastic resin composition (molded article) may include the alkali (earth) metal salt of perfluoroalkylsulfonic acid in an amount of about 0.05 parts by weight to about 0.3 parts by weight, for example, about 0.1 parts by weight to about 0.25 parts by weight, relative to about 100 parts by weight of the polycarbonate resin. In some embodiments, the thermoplastic resin composition (molded article) may include the alkali (earth) metal salt of perfluoroalkylsulfonic acid in an amount about 0.05, 0.06, 0.07, 0.08, 0.09, 0.1, 0.11, 0.12, 0.13, 0.14, 0.15, 0.16. 0.17, 0.18, 0.19, 0.20, 0.21, 0.22, 0.23, 0.24, 0.25, 0.26, 0.27, 0.28, 0.29, or 0.3 parts by weight, relative to about 100 parts by weight of the polycarbonate resin. Further, according to some embodiments, the alkali (earth) metal salt of perfluoroalkylsulfonic acid can be present in an amount of from about any of the foregoing amounts to about any other of the foregoing amounts.

If the amount of the alkali (earth) metal salt of perfluoroalkylsulfonic acid is less than about 0.05 parts by weight relative to about 100 parts by weight of the polycarbonate resin, the thermoplastic resin composition (molded article) can suffer from deterioration in flame retardancy and the like. If the amount of the alkali (earth) metal salt of perfluoroalkylsulfonic acid exceeds about 0.3 parts by weight, the thermoplastic resin composition (molded article) can suffer from deterioration in impact resistance, thermal stability, and the like.

In some embodiments, the phosphazene compound (E) and the alkali (earth) metal salt of perfluoroalkylsulfonic acid (F) may be present in a weight ratio (E:F) of about 1:0.006 to about 1:0.05, for example, about 1:0.012 to about 1:0.03. In some embodiments, the phosphazene compound (E) and the alkali (earth) metal salt of perfluoroalkylsulfonic acid (F) may be present in a weight ratio (E:F) of about 1:0.006, 1:0.007, 1:0.008, 1:0.009, 1:0.01, 1:0.011, 1:0.012, 1:0.013, 1:0.014, 1:0.015, 1:0.016, 1:0.017, 1:0.018, 1:0.019, 1:0.02, 1:0.021, 1:0.022, 1:0.023, 1:0.024, 1:0.025, 1:0.026, 1:0.027, 1:0.028, 1:0.029, 1:0.03, 1:0.031, 1:0.032, 1:0.033, 1:0.034, 1:0.035, 1:0.036, 1:0.037, 1:0.038, 1:0.039, 1:0.04, 1:0.041, 1:0.042, 1:0.043, 1:0.044, 1:0.045, 1:0.046, 1:0.047, 1:0.048, 1:0.049, or 1:0.05. Further, according to some embodiments, the phosphazene compound (E) and the alkali (earth) metal salt of perfluoroalkylsulfonic acid (F) may be present in a weight ratio (E:F) of from about any of the foregoing weight ratios to about any other of the foregoing weight ratios.

Within this range, the thermoplastic resin composition (molded article) can have good properties in terms of flame retardancy, heat resistance, and the like.

The thermoplastic resin composition according to embodiments of the present disclosure may further include one or more additives. Examples of additives may include without limitation inorganic fillers, compatibilizers, release agents, lubricants, plasticizers, heat stabilizers, light stabilizers, anti-dripping agents, antioxidants, pigments, dyes, and the like, and combinations and/or mixtures thereof. When present, the additives may be present in an amount of about 0.01 parts by weight to about 40 parts by weight relative to about 100 parts by weight of the polycarbonate resin, without being limited thereto.

The thermoplastic resin composition according to embodiments of the present disclosure may be prepared in pellet form by mixing the aforementioned components, followed by melt extrusion at about 200° C. to about 300° C., for example, about 220° C. to about 280° C., using a typical twin-screw extruder.

In some embodiments, the thermoplastic resin composition may have a flame retardancy of V-1 or higher, for example a flame retardancy of V-0, as measured on a 0.6 mm thick specimen by a UL-94 50W vertical test method.

In some embodiments, the thermoplastic resin composition may have a fracture height of about 85 cm to about 120 cm, for example, about 90 cm to about 115 cm, at which a specimen of the thermoplastic resin composition is fractured upon dropping a weight of 500 g on the specimen in accordance with the DuPont drop test method, in which the specimen is prepared by dipping a 1 mm thick specimen of the thermoplastic resin composition in a thinner solution for 2.5 minutes, drying the specimen at 80° C. for 20 minutes, and leaving the specimen at room temperature for 24 hours. In some embodiments, the thermoplastic resin composition may have a fracture height of about 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, or 120 cm. Further, according to some embodiments, the thermoplastic resin composition may have a fracture height of from about any of the foregoing values to about any other of the foregoing values.

In some embodiments, the thermoplastic resin composition may have a notched Izod impact strength of about 85 kgf·cm/cm to about 110 kgf·cm/cm, for example, about 90 kgf·cm/cm to about 105 kgf·cm/cm, as measured on a 3.2 mm thick specimen in accordance with ASTM D256. In some embodiments, the thermoplastic resin composition may have a notched Izod impact strength of about 85, 86, 87, 88, 89, 90, 91, 92, 93, 94, 95, 96, 97, 98, 99, 100, 101, 102, 103, 104, 105, 106, 107, 108, 109, or 110 kgf·cm/cm. Further, according to some embodiments, the thermoplastic resin composition may have a notched Izod impact strength of from about any of the foregoing values to about any other of the foregoing values.

In some embodiments, the thermoplastic resin composition may have a Vicat softening temperature of about 120° C. to about 135° C., for example, about 123° C. to about 132° C., as measured under a load of 5 kg at 50° C./hr in accordance with ISO 306. In some embodiments, the thermoplastic resin composition may have a Vicat softening temperature of about 120, 121, 122, 123, 124, 125, 126, 127, 128, 129, 130, 131, 132, 133, 134, or 135° C. Further, according to some embodiments, the thermoplastic resin composition may have a Vicat softening temperature of from about any of the foregoing temperatures to about any other of the foregoing temperatures.

A molded article according to the present disclosure is formed of the thermoplastic resin composition set forth above. The thermoplastic resin composition may be prepared in pellet form. The prepared pellets may be produced into various molded articles (products) by various molding methods, such as injection molding, extrusion molding, vacuum molding, and casting. These molding methods are well known to those skilled in the art. The molded articles can have good properties in terms of flame retardancy, chemical resistance (post-plating impact resistance), impact resistance, heat resistance, and balance therebetween, and thus can be advantageously used for interior and/or exterior materials for electrical and/or electronic products (for example, interior and/or exterior materials for mobile phones) and the like.

Next, the present disclosure will be described in more detail with reference to the following examples. However, it should be noted that these examples are provided for illustration only and should not be construed in any way as limiting the invention.

EXAMPLE

Details of components used in the Examples and Comparative Examples are as follows.

(A) Polycarbonate Resin

A bisphenol-A polycarbonate resin having a weight average molecular weight (Mw) of 36,000 g/mol (Manufacturer: Lotte Advanced Materials Co., Ltd.) is used.

(B) First Rubber-Modified Vinyl Graft Copolymer

An acrylonitrile-butadiene-styrene copolymer (g-ABS, emulsion polymerization) obtained through graft copolymerization of 25 wt % of styrene and 15 wt % of acrylonitrile to 60 wt % of polybutadiene rubber (average particle diameter: 130 nm) as a rubber polymer is used.

(C) Second Rubber-Modified Vinyl Graft Copolymer

An acrylonitrile-butadiene-styrene copolymer (g-ABS, emulsion polymerization) obtained through graft copolymerization of 25 wt % of styrene and 15 wt % of acrylonitrile to 60 wt % of polybutadiene rubber (average particle diameter: 320 nm) as a rubber polymer is used.

(D) Silicone Rubber-Modified Vinyl Graft Copolymer

A copolymer (Manufacturer: Mitsubishi Chemical Co., Product Name: Metablen S-2100) obtained through graft copolymerization of 20 wt % of methyl methacrylate to 80 wt % of polydimethylsiloxane/butyl acrylate (PDMS/BA) rubber (average particle diameter: 500 nm) as a rubber polymer is used.

(E) Phosphorus Compound (E1) As a phosphazene compound, a cyclic phenoxy phosphazene compound (Manufacturer Fushimi Pharmaceutical, Product Name: Rabitle® FP-110) is used.

(E2) As a phosphate compound, resorcinol-di(bis-2,6-dimethylphenyl)phosphate (Manufacturer: DAIHACHI, Product Name: PX-200) is used.

(F) Alkali (Earth) Metal Salt of Organic Sulfonic Acid (F1) As an alkali (earth) metal salt of perfluoroalkylsulfonic acid, a potassium salt of perfluorobutanesulfonic acid (Manufacturer 3M, Product Name: FR-2050) is used.

(F2) Potassium diphenyl sulfone sulfonate (Manufacturer Seal Sands Chemicals, Product Name: KSS) is used.

Examples 1 to 11 and Comparative Examples 1 to 12

The above components are mixed in amounts as listed in Tables 1 to 4 and subjected to extrusion under conditions of 250° C. after adding other additives as needed, thereby preparing a thermoplastic resin composition in pellet form. Extrusion is performed using a twin-screw extruder (L/D=44, Φ: 45 mm) and the prepared pellets are dried at 80° C. for 6 hours or more and injection-molded in a screw-type injection molding machine (150 ton single injection molding machine, cylinder temperature: 300° C., mold temperature: 90° C.), thereby preparing specimens. The specimens are evaluated as to the following properties by the following method, and results are shown in Tables 1 to 4.

Property Measurement (1) Flame retardancy: Flame retardancy is measured on a 0.6 mm thick specimen by a UL-94 vertical test method.

(2) Chemical resistance (post-plating impact resistance): A 1 mm thick specimen is dipped in a thinner solution for 2.5 minutes, dried at 80° C. for 20 minutes, and left at room temperature for 24 hours, followed by measuring a fracture height (unit): cm), at which the specimen is fractured upon dropping a weight of 500 g on the specimen in accordance with the DuPont drop test method.

(3) Impact resistance (unit: kgf·cm/cm): Notched Izod impact strength is measured on a 3.2 mm thick specimen in accordance with ASTM D256

(4) Heat resistance: Vicat softening temperature (unit: ° C.) is measured under a load of 5 kg at 50° C./hr in accordance with ISO 306.

TABLE 1

| | Example | | | | |
|---|---|---|---|---|---|
| | 1 | 2 | 3 | 4 | 5 |
| (A) (parts by weight) | 100 | 100 | 100 | 100 | 100 |
| (B) (parts by weight) | 0.5 | 0.75 | 1 | 0.75 | 0.75 |
| (C) (parts by weight) | 0.75 | 0.75 | 0.75 | 0.5 | 1 |
| (D) (parts by weight) | 0.75 | 0.75 | 0.75 | 0.75 | 0.75 |
| (E1) (parts by weight) | 8 | 8 | 8 | 8 | 8 |
| (E2) (parts by weight) | — | — | — | — | — |
| (F1) (parts by weight) | 0.15 | 0.15 | 0.15 | 0.15 | 0.15 |
| (F2) (parts by weight) | — | — | — | — | — |
| Flame retardancy | V-0 | V-0 | V-1 | V-0 | V-1 |
| Specimen fracture height (cm) | 95 | 100 | 110 | 90 | 115 |
| Notched Izod impact strength (kgf · cm/cm) | 90 | 95 | 100 | 90 | 105 |
| VST (° C.) | 129 | 128 | 127 | 129 | 127 |

TABLE 2

| | Example | | | | | |
|---|---|---|---|---|---|---|
| | 6 | 7 | 8 | 9 | 10 | 11 |
| (A) (parts by weight) | 100 | 100 | 100 | 100 | 100 | 100 |
| (B) (parts by weight) | 0.75 | 0.75 | 0.75 | 0.75 | 0.75 | 0.75 |
| (C) (parts by weight) | 0.75 | 0.75 | 0.75 | 0.75 | 0.75 | 0.75 |
| (D) (parts by weight) | 0.5 | 1.0 | 0.75 | 0.75 | 0.75 | 0.75 |
| (E1) (parts by weight) | 8 | 8 | 5 | 10 | 8 | 8 |
| (E2) (parts by weight) | — | — | — | — | — | — |
| (F1) (parts by weight) | 0.15 | 0.15 | 0.15 | 0.15 | 0.1 | 0.2 |
| (F2) (parts by weight) | — | — | — | — | — | — |
| Flame retardancy | V-0 | V-1 | V-0 | V-0 | V-1 | V-0 |
| Specimen fracture height (cm) | 90 | 110 | 110 | 100 | 110 | 110 |
| Notched Izod impact strength (kgf · cm/cm) | 90 | 100 | 105 | 90 | 100 | 100 |
| VST (° C.) | 129 | 127 | 132 | 123 | 128 | 128 |

TABLE 3

| | Comparative Example | | | | | |
|---|---|---|---|---|---|---|
| | 1 | 2 | 3 | 4 | 5 | 6 |
| (A) (parts by weight) | 100 | 100 | 100 | 100 | 100 | 100 |
| (B) (parts by weight) | 0.05 | 2 | 0.75 | 0.75 | 0.75 | 0.75 |
| (C) (parts by weight) | 0.75 | 0.75 | 0.05 | 2 | 0.75 | 0.75 |
| (D) (parts by weight) | 0.75 | 0.75 | 0.75 | 0.75 | 0.05 | 2 |
| (E1) (parts by weight) | 8 | 8 | 8 | 8 | 8 | 8 |
| (E2) (parts by weight) | — | — | — | — | — | — |
| (F1) (parts by weight) | 0.15 | 0.15 | 0.15 | 0.15 | 0.15 | 0.15 |
| (F2) (parts by weight) | — | — | — | — | — | — |
| Flame retardancy | V-0 | Fail | V-0 | Fail | V-0 | Fail |
| Specimen fracture height (cm) | 80 | 115 | 65 | 125 | 75 | 120 |
| Notched Izod impact strength (kgf · cm/cm) | 80 | 100 | 75 | 105 | 85 | 105 |
| VST (° C.) | 129 | 127 | 128 | 127 | 129 | 127 |

TABLE 4

| | Comparative Example | | | | | |
|---|---|---|---|---|---|---|
| | 7 | 8 | 9 | 10 | 11 | 12 |
| (A) (parts by weight) | 100 | 100 | 100 | 100 | 100 | 100 |
| (B) (parts by weight) | 0.75 | 0.75 | 0.75 | 0.75 | 0.75 | 0.75 |
| (C) (parts by weight) | 0.75 | 0.75 | 0.75 | 0.75 | 0.75 | 0.75 |
| (D) (parts by weight) | 0.75 | 0.75 | 0.75 | 0.75 | 0.75 | 0.75 |
| (E1) (parts by weight) | 2 | 16 | — | 8 | 8 | 8 |
| (E2) (parts by weight) | — | — | 8 | — | — | — |
| (F1) (parts by weight) | 0.15 | 0.15 | 0.15 | 0.04 | 0.4 | — |
| (F2) (parts by weight) | — | — | — | — | — | 0.15 |
| Flame retardancy | Fail | V-0 | Fail | V-2 | V-1 | V-2 |
| Specimen fracture height (cm) | 120 | 80 | 60 | 100 | 85 | 85 |
| Notched Izod impact strength (kgf · cm/cm) | 105 | 70 | 65 | 95 | 80 | 85 |
| VST (° C.) | 138 | 116 | 125 | 128 | 128 | 129 |

From the results, it can be seen that the thermoplastic resin compositions (molded articles) according to the present disclosure exhibit good properties in terms of flame retardancy, chemical resistance (post-plating impact resistance), impact resistance, heat resistance, and balance therebetween.

Conversely, it can be seen that the thermoplastic resin composition of Comparative Example 1 prepared using a smaller amount of the first rubber-modified vinyl graft copolymer suffers from deterioration in impact resistance, chemical resistance, and the like; the thermoplastic resin composition of Comparative Example 2 prepared using an excess of the first rubber-modified vinyl graft copolymer suffers from deterioration in flame retardancy and the like; the thermoplastic resin composition of Comparative Example 3 prepared using a smaller amount of the second rubber-modified vinyl graft copolymer suffers from deterioration in impact resistance, chemical resistance, and the like; the thermoplastic resin composition of Comparative Example 4 prepared using an excess of the second rubber-modified vinyl graft copolymer suffers from deterioration in flame retardancy and the like; the thermoplastic resin composition of Comparative Example 5 prepared using a smaller amount of the silicone rubber-modified vinyl graft copolymer suffers from deterioration in chemical resistance, and the like; and the thermoplastic resin composition of Comparative Example 6 prepared using an excess of the silicone rubber-modified vinyl graft copolymer suffers from deterioration in flame retardancy and the like. In addition, it can be seen that the thermoplastic resin composition of Comparative Example 7 prepared using a smaller amount of the phosphazene compound suffers from deterioration in flame retardancy and the like; the thermoplastic resin composition of Comparative Example 8 prepared using an excess of the phosphazene compound suffers from deterioration in impact resistance, chemical resistance, heat resistance, and the like; and the thermoplastic resin composition of Comparative Example 9 prepared using the phosphate compound (E2) instead of the phosphazene compound suffers from deterioration in flame retardancy, impact resistance, chemical resistance, and the like. Further, it can be seen that the thermoplastic resin composition of Comparative Example 10 prepared using a smaller amount of the alkali (earth) metal salt of perfluoroalkylsulfonic acid suffers from deterioration in flame retardancy and the like; the thermoplastic resin composition of Comparative Example 11 prepared using an excess of the alkali (earth) metal salt of perfluoroalkylsulfonic acid suffers from deterioration in impact resistance and the like; and the thermoplastic resin composition of Comparative Example 12 prepared using potassium diphenyl sulfone sulfonate (F2) instead of the alkali (earth) metal salt of perfluoroalkylsulfonic acid, suffers from deterioration in flame retardancy and the like.

Exemplary embodiments have been disclosed herein, and although specific terms are employed, unless otherwise noted, they are to be interpreted in a generic and descriptive sense only and not for purpose of limitation. Although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

It is within the scope of this disclosure for one or more of the terms "substantially," "about," "approximately," and/or the like, to qualify each adjective and adverb of the foregoing disclosure to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

For example, all numerical values provided throughout this disclosure can be approximate, and for each range specified in this disclosure, all values within the range and all subranges within the range are also disclosed. Approximate values can be calculated, and it is believed that each value can vary by for example plus or minus about 25%, for example plus or minus about 20%, for example plus or minus about 15%, for example plus or minus about 10%, for example plus or minus about 5%, for example plus or minus 4%, for example plus or minus 3%, for example plus or minus 2%, for example plus or minus 1%, for example plus or minus less than 1%, for example plus or minus 0.5%, and as another example less than plus or minus 0.5%, including all values and subranges therebetween for each of the above ranges.

The use of the term "and/or" includes any and all combinations of one or more of the associated listed items.

As used herein, indefinite articles "a" and "an" refer to at least one ("a" and "an" can refer to singular and/or plural element(s)).

What is claimed is:

1. A thermoplastic resin composition comprising:
   about 100 parts by weight of a polycarbonate resin;
   about 0.1 parts by weight to about 1.5 parts by weight of a first rubber-modified vinyl graft copolymer comprising a diene rubber polymer having an average particle diameter of about 50 nm to about 200 nm;
   about 0.1 parts by weight to about 1.5 parts by weight of a second rubber-modified vinyl graft copolymer comprising a diene rubber polymer having an average particle diameter of about 250 nm to about 400 nm;
   about 0.1 parts by weight to about 1.5 parts by weight of a silicone rubber-modified vinyl graft copolymer;
   about 3 parts by weight to about 15 parts by weight of a phosphazene compound; and
   about 0.05 parts by weight to about 0.3 parts by weight of an alkali (earth) metal salt of perfluoroalkylsulfonic acid.

2. The thermoplastic resin composition according to claim 1, wherein the first rubber-modified vinyl graft copolymer is prepared through graft polymerization of a monomer mixture comprising an aromatic vinyl monomer and a vinyl cyanide monomer to a diene rubber polymer having an average particle diameter of about 50 nm to about 200 nm.

3. The thermoplastic resin composition according to claim 1, wherein the second rubber-modified vinyl graft copolymer is prepared through graft polymerization of a monomer mixture comprising an aromatic vinyl monomer and a vinyl cyanide monomer to a diene rubber polymer having an average particle diameter of about 250 nm to about 400 nm.

4. The thermoplastic resin composition according to claim 1, wherein the silicone rubber-modified vinyl graft copolymer is prepared through graft polymerization of an alkyl (meth)acrylate monomer to a silicone rubber polymer.

5. The thermoplastic resin composition according to claim 1, wherein a weight ratio of the first rubber-modified vinyl graft copolymer to the second rubber-modified vinyl graft copolymer ranges from about 1:0.1 to about 1:2.

6. The thermoplastic resin composition according to claim 1, wherein a weight ratio of the sum of the first rubber-modified vinyl graft copolymer and the second rubber-modified vinyl graft copolymer to the silicone rubber-modified vinyl graft copolymer ranges from about 1:0.1 to about 1:1.

7. The thermoplastic resin composition according to claim 1, wherein a weight ratio of the phosphazene compound to the alkali (earth) metal salt of perfluoroalkylsulfonic acid ranges from about 1:0.006 to about 1:0.05.

8. The thermoplastic resin composition according to claim 1, wherein the thermoplastic resin composition has a flame retardancy of V-1 or higher, as measured on a 0.6 mm thick specimen in accordance with the UL-94 vertical test method.

9. The thermoplastic resin composition according to claim 1, wherein the thermoplastic resin composition has a fracture height of about 85 cm to about 120 cm, at which a specimen of the thermoplastic resin composition is fractured upon dropping a weight of 500 g on the specimen in accordance with the DuPont drop test method, the specimen being prepared by dipping a 1 mm thick specimen of the thermoplastic resin composition in a thinner solution for 2.5 minutes, drying the specimen at 80° C. for 20 minutes, and leaving the specimen at room temperature for 24 hours.

10. The thermoplastic resin composition according to claim 1, wherein the thermoplastic resin composition has a notched Izod impact strength of about 85 kgf·cm/cm to about 110 kgf·cm/cm, as measured on a 3.2 mm thick specimen in accordance with ASTM D256.

11. The thermoplastic resin composition according to claim 1, wherein the thermoplastic resin composition has a Vicat softening temperature of about 120° C. to about 135° C., as measured under a load of 5 kg at 50° C./hr in accordance with ISO 306.

12. A molded article produced from the thermoplastic resin composition according to claim 1.

13. The thermoplastic resin composition according to claim 1, wherein the phosphazene compound comprises a compound represented by Formula 1:

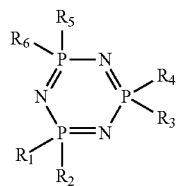

[Formula 1]

wherein $R_1$, $R_2$, $R_3$, $R_4$, $R_5$ and $R_6$ are each independently a hydrogen atom, a halogen atom, a substituted or unsubstituted $C_1$ to $C_{20}$ alkyl group, a substituted or unsubstituted $C_2$ to $C_7$ alkenyl group, a substituted or unsubstituted $C_3$ to $C_{20}$ cycloalkyl group, a substituted or unsubstituted $C_2$ to $C_{20}$ heterocycloalkyl group, a $C_1$ to $C_{20}$ alkoxy group, a $C_6$ to $C_{20}$ aryl group, a $C_6$ to $C_{20}$ aryloxy group, a $C_5$ to $C_{20}$ heteroaryl group, a substituted or unsubstituted $C_3$ to $C_{20}$ alkoxy carbonyl alkyl group, a substituted or unsubstituted $C_2$ to $C_{10}$ carbonyl alkyl group, an amino group, or a hydroxyl group.

* * * * *